Aug. 25, 1931.  F. A. E. JENKINS  1,820,458
ELECTRICAL WATER HEATER
Filed June 10, 1930  3 Sheets-Sheet 1

F. A. E. Jenkins
INVENTOR

By: Marks & Clerk
Attys.

Aug. 25, 1931.    F. A. E. JENKINS    1,820,458
ELECTRICAL WATER HEATER
Filed June 10, 1930    3 Sheets-Sheet 2

F. A. E. Jenkins
INVENTOR

By: Marks & Clerk
Attys.

Aug. 25, 1931.　　　F. A. E. JENKINS　　　1,820,458
ELECTRICAL WATER HEATER
Filed June 10, 1930　　　3 Sheets-Sheet 3
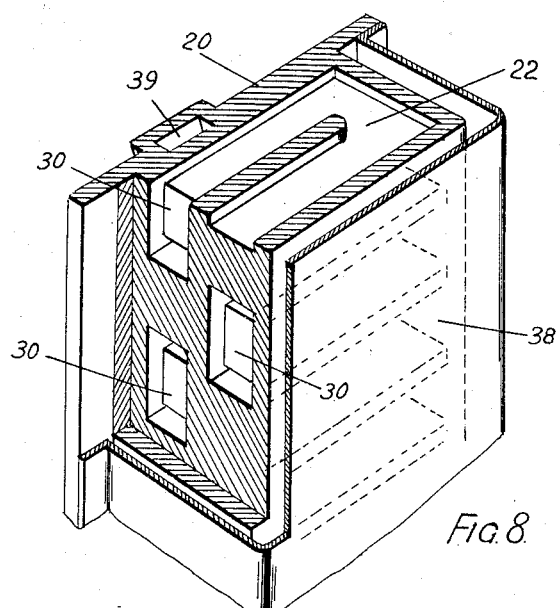
FIG. 8.
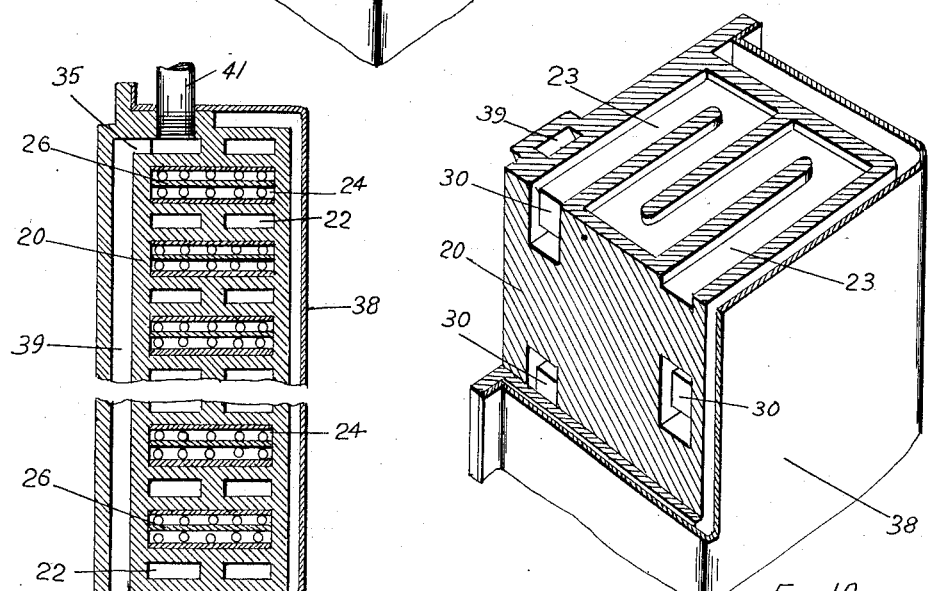
FIG. 9.　　　FIG. 10.
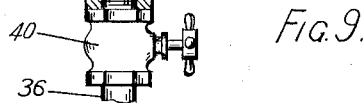
F. A. E. Jenkins
INVENTOR Patented Aug. 25, 1931

1,820,458

UNITED STATES PATENT OFFICE

FREDRICK ALFRED EDWARD JENKINS, OF CANTERBURY, NEAR SYDNEY, AUSTRALIA

ELECTRICAL WATER HEATER

Application filed June 10, 1930, Serial No. 460,243, and in Australia May 2, 1929.

This invention relates to electrical water heaters of the non-contact type, and it has for its object to provide a heater which is of cheap and simple construction and durable in use, the heater being adapted to be directly connected to a suitable source of water supply.

Figure 1:
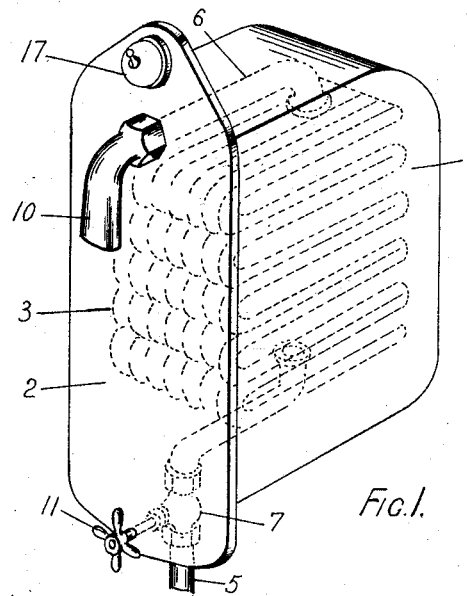
Figure 3:
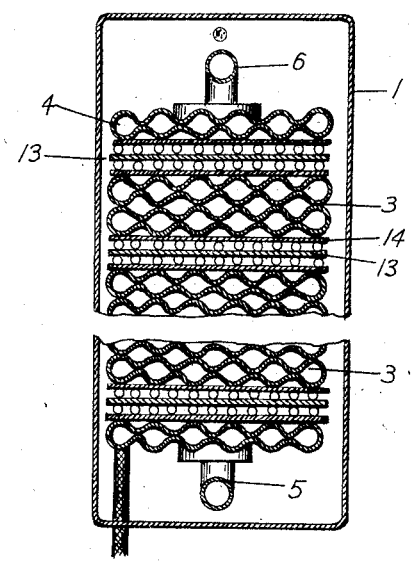
Figure 2:
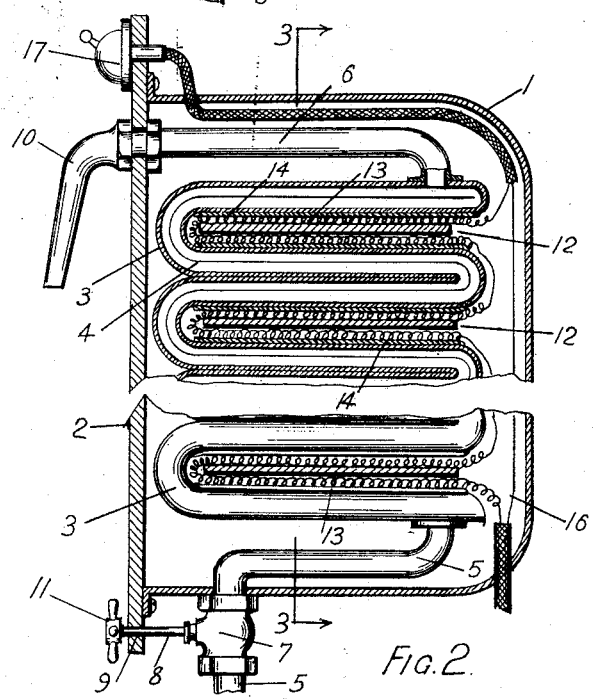
Figure 4:
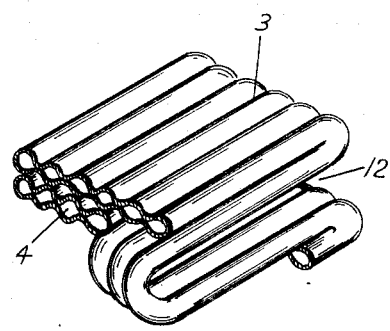
Figure 5:
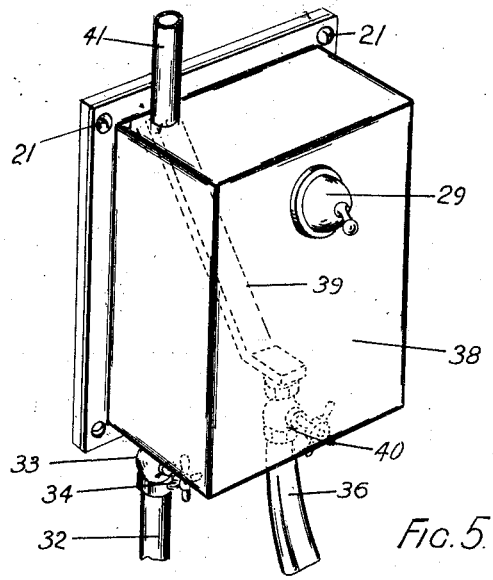
Figure 6:
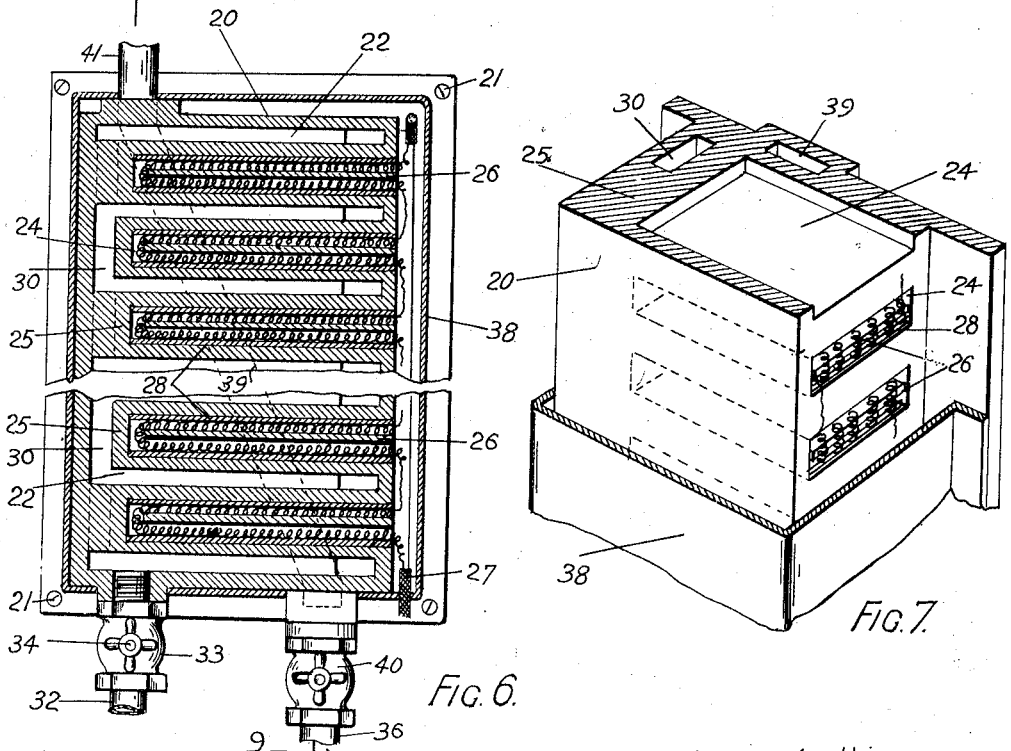
Figure 7:
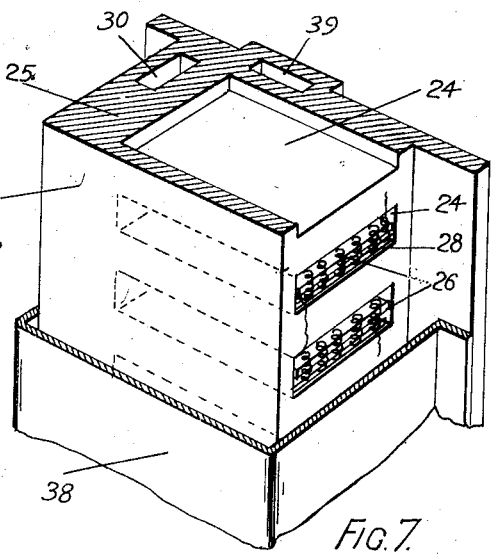

Referring to the accompanying drawings, Fig. 1 is a perspective view of one form of the water heater; Fig. 2 is a longitudinal sectional elevation thereof; Fig. 3 is a cross-sectional elevation on line 3—3, Fig. 2; Fig. 4 is a sectional perspective view of a heating unit for water passing therethrough; Fig. 5 is a perspective view of a modification of the water heater; Fig. 6 is a longitudinal sectional elevation thereof; Figs. 7 and 8 are sectional perspective views of the water heater chamber; Fig. 9 is a sectional elevation on line 9—9, Fig. 6; and Fig. 10 is a view similar to Fig. 8 but showing a modified form of water passage.

With reference to Figs. 1 to 4, the heater is provided with a casing 1 of suitable material and carrying a metal plate 2 whereby the heater will be affixable to an appropriate support or locatable in a recess in the wall of a building. The casing 1 is adapted to receive a plurality of U-shaped corrugated elements 3 (Fig. 4) which are jointed to each other to form a sinuous water passage 4. At one end of such passage 4 is connected the cold water supply pipe 5 and at the other end thereof is connected the hot water exit pipe 6.

The pipe 5 may be furnished with a control cock 7, the spindle 8 of which may pass through a bearing 9 in the plate 2. At its outer end the spindle 8 may be fitted with an operating handle 11. The outlet end of the exit pipe 6 may pass through the plate 2 and such end may be provided with a delivery nozzle 10. By arranging the outlet end of the exit pipe 6 and the spindle 8 of the control cock 7 to pass through the plate 2 it is provided that the heater will be earth connected when the plate 2 is attached to a wall or other appropriate structure associated with the ground.

Between the separate sinuate bends of the elements 3 is a cavity or pocket 12 each of which is adapted to accommodate a suitable electrical heating element 13. Such elements are electrically insulated from the elements 3 by the electric insulators 14. The heating elements 13 may be suitably connected to an appropriate source of electric current supply. The leads 16 for such current supply may pass into the casing 1 and these may have associated therewith a control switch 17 which may be mounted on the plate 2.

If desired, the switch 17 and the control cock 7 may be interconnected to ensure that both may be operated simultaneously.

In operation, when the cock 7 is turned to "on" position water will pass from the supply pipe 5 through the sinuous passage 4 formed by the elements 3 and after being heated in such passage it will have exit through the delivery nozzle 10, the water being heated in the passage 4 upon the switch 17 having also been operated to allow electrical current to pass to the heating elements 13.

Referring to Figs. 5 to 10, in which modified forms of the heater are shown, a casing 20 of metal is furnished for the heater. Within the casing are a plurality of U-shaped passages 22 (Fig. 8) or a plurality of sinuous passages 23 (Fig. 10) which are disposed parallel to one another. Adjacent passages 22 or 23 are separated from each other by a pocket 24 (Fig. 7). Said pockets 24 are closed at one end 25, and they are provided to accommodate suitable electrical heating elements 26 which are appropriately electrically insulated from the casing 20 by electrical insulators 28. The heating elements 26 may be electrically connected to leads 27 from a source of electric current supply and having associated therewith switch means 29 which may be mounted on the cover 38 that fits over the heater and may be secured thereto by screws 21 for the purpose of protecting the heating elements 26.

The respective passages 22 or 23 are interconnected by ports 30 whereby a continuous sinuous passage for water will thereby be provided within the chamber 20. Said ports 30 may be located in the closed ends 25 of the pockets 24 and they may be arranged in staggered formation (see Fig. 8).

To the entry end of the said continuous sinuous water passage may be connected a cold water supply pipe 32 fitted with a stop cock 33 having an operating handle 34. The exit end of the said continuous sinuous passage may have an exit port 35 (see Fig. 9) leading into a delivery passage 39 to nozzle 36, which may be provided with a stop cock 40. Near the exit port 35 may be connected a pipe 41 leading to a shower.

The heater shown in Figs. 5 to 10 is fixed in position on a support and is also operated similarly to the heater described and shown in reference to Figs. 1 to 4.

What I claim as my invention and desire to secure by Letters Patent is:—

1. A water heater comprising a casing having a plurality of circuitous water passages therein connected at one of their ends by ports, said casing having pockets therein disposed between the passages, said casing having a delivery passage therein directly connecting the end passages only, heating elements in the pockets, a pipe for conducting cold water to the passages, and a pipe for discharging water from the passages connected with the delivery passage.

2. A water heater comprising a casing having a plurality of circuitous water passages therein and connected at one of their ends by ports, said casing having pockets formed therein between the passages, electrical heating elements in the pockets, one of the walls of said pockets having a discharge passage extending therethrough and directly connecting only the end passages.

In testimony whereof I affix my signature.

FREDRICK ALFRED EDWARD JENKINS.